(12) United States Patent
Tanaka et al.

(10) Patent No.: US 7,176,541 B2
(45) Date of Patent: Feb. 13, 2007

(54) PRESSURE SENSOR

(75) Inventors: Hiroaki Tanaka, Kariya (JP); Inao Toyoda, Anjo (JP); Ichiharu Kondo, Nagoya (JP); Makoto Totani, Kariya (JP)

(73) Assignee: Denso Corporation, Kariya (JP)

( * ) Notice: Subject to any disclaimer, the term of this patent is extended or adjusted under 35 U.S.C. 154(b) by 77 days.

(21) Appl. No.: 11/137,404

(22) Filed: May 26, 2005

(65) Prior Publication Data

US 2005/0269654 A1  Dec. 8, 2005

(30) Foreign Application Priority Data

Jun. 3, 2004 (JP) ............................ 2004-166112
Jun. 3, 2004 (JP) ............................ 2004-166113
Jun. 3, 2004 (JP) ............................ 2004-166114

(51) Int. Cl.
H01L 29/84 (2006.01)

(52) U.S. Cl. .................. 257/419; 257/414; 257/415; 257/417; 257/418; 257/E29.324; 73/700; 73/715

(58) Field of Classification Search ............... None
See application file for complete search history.

(56) References Cited

U.S. PATENT DOCUMENTS 4,732,042 A * 3/1988 Adams ................... 73/706
5,116,331 A    5/1992 Chapman
6,346,742 B1   2/2002 Bryzek et al.
6,393,922 B1   5/2002 Winterer

FOREIGN PATENT DOCUMENTS

JP    A-10-153508      6/1998
JP    A-2001-343298   12/2001

OTHER PUBLICATIONS

Search Report from French Patent Office issued on Jul. 7, 2006 for the corresponding French patent application No. FR 0505574 (a copy thereof).

* cited by examiner

Primary Examiner—Nathan J. Flynn
Assistant Examiner—Kevin Quinto
(74) Attorney, Agent, or Firm—Posz Law Group, PLC

(57) ABSTRACT

A pressure sensor chip includes a diaphragm and pads. A flexible printed circuit board (FPC) includes a resin sheet having a through-hole and wiring patterns that are formed within the resin sheet and sealed. The resin sheet is press-fitted to the pressure sensor chip such that the diaphragm is bared at the through-hole. The wiring patterns are connected to the pads, and junctions between the wiring patterns and the pads are sealed with the resin sheet.

12 Claims, 18 Drawing Sheets

PRESSURE SENSOR

CROSS REFERENCE TO RELATED APPLICATION

This application is based on and incorporates herein by reference Japanese Patent Applications No. 2004-166112, 2004-166113, and 2004-166114 all filed on Jun. 3, 2004.

FIELD OF THE INVENTION

The present invention relates to a pressure sensor.

BACKGROUND OF THE INVENTION

Packaging structures of pressure sensor chips, including electrical connections and protective structures, are proposed in U.S. Pat. No. 6,393,922 and Japanese Patent Application No. 10-153508. In U.S. Pat. No. 6,393,922, the pressure sensor chip and bonding wires are sealed with a filling material. In Japanese Patent Application No. 10-153508, an aluminum pad formed on a semiconductor substrate is coated with a Ti/Pd film, and the semiconductor substrate, thereby constituting a diaphragm, is covered with a protecting film and a silicone gel. The protecting film is made of silicone oxide, silicon nitride or the like.

If the pressure sensor chips are exposed to corrosives, such as exhaust gases from engines, the above structures will not provide sufficient protection. Moreover, the silicone gel is provided over a gage formed in the diaphragm. The silicone gel reduces the sensitivity of the pressure sensor, and its internal stress results in excessive stress to the diaphragm and variations in the sensitivity characteristic.

SUMMARY OF THE INVENTION

The present invention therefore has an objective to provide a pressure sensor having high-precision and high-corrosion resistance. A pressure sensor of the present invention includes a pressure sensor chip and a flexible printed circuit board. The pressure sensor chip has a diaphragm and pads. The flexible printed circuit board has wiring patterns and a resin sheet having a though-hole and sealing the wiring patterns therein. The wiring patterns are connected to the pads. The resin sheet is press-fitted to the pressure sensor chip such that the diaphragm is bared at the through-hole and junctions between he wiring patterns and the pads are sealed.

With this configuration, the wiring patterns and the electrical are protected from corrosion. This corrosion protective structure can provide higher resistance to corrosion in comparison with corrosion protective structures in which pads of pressure sensor chips and bonding wires are sealed with filling materials. Moreover, pressure detection can be performed with high accuracy because the resin sheet is press-fitted to the sensor chip such that the diaphragm is bared.

A pressure sensor of the present invention includes a pressure sensor chip, a circuit chip, and a flexible printed circuit board. The pressure sensor chip has a diaphragm and pads. The circuit chip has pads. The flexible printed circuit board has wiring patterns and a resin sheet sealing the wiring patterns therein. The pressure sensor chip is mounted on the circuit chip. The wiring patterns are connected to the pads of the pressure sensor chip. The pads of the circuit chip are connected to the wiring patterns. The resin sheet is press-fitted to the pressure sensor chip and the circuit chip such that junctions between the wiring patterns and the pads of the pressure sensor chip and junctions between the pads of the circuit chip and the wiring patterns are sealed.

With this configuration, the electrical junctions and the wiring patterns are protected from corrosion. Moreover, a size of the pressure sensor is reduced by mounting the pressure sensor chip on the circuit chip in comparison to a structure in which a sensor chip and a circuit chip are arranged in the same plane.

A pressure sensor of the present invention includes a pressure sensor chip, a case, and a flexible printed circuit board. The pressure sensor chip has a diaphragm and pads. The case has a chip housing portion for housing the pressure sensor chip such that a surface of the pressure sensor chip on which the pads are formed is bared at an opening thereof. The flexible printed circuit board has wiring patterns and a resin sheet sealing the wiring patterns therein. The wiring patterns are connected to the pads of the pressure sensor chip. The resin sheet is press-fitted to the pressure sensor chip and the case to cover the opening and to seal junctions between the wiring patterns and the pads.

With this configuration, the junctions and the wiring patterns are protected from corrosion. The pressure sensor chip is covered with the flexible printed circuit board and the case. This provides further protection to the sensor chip against corrosion.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
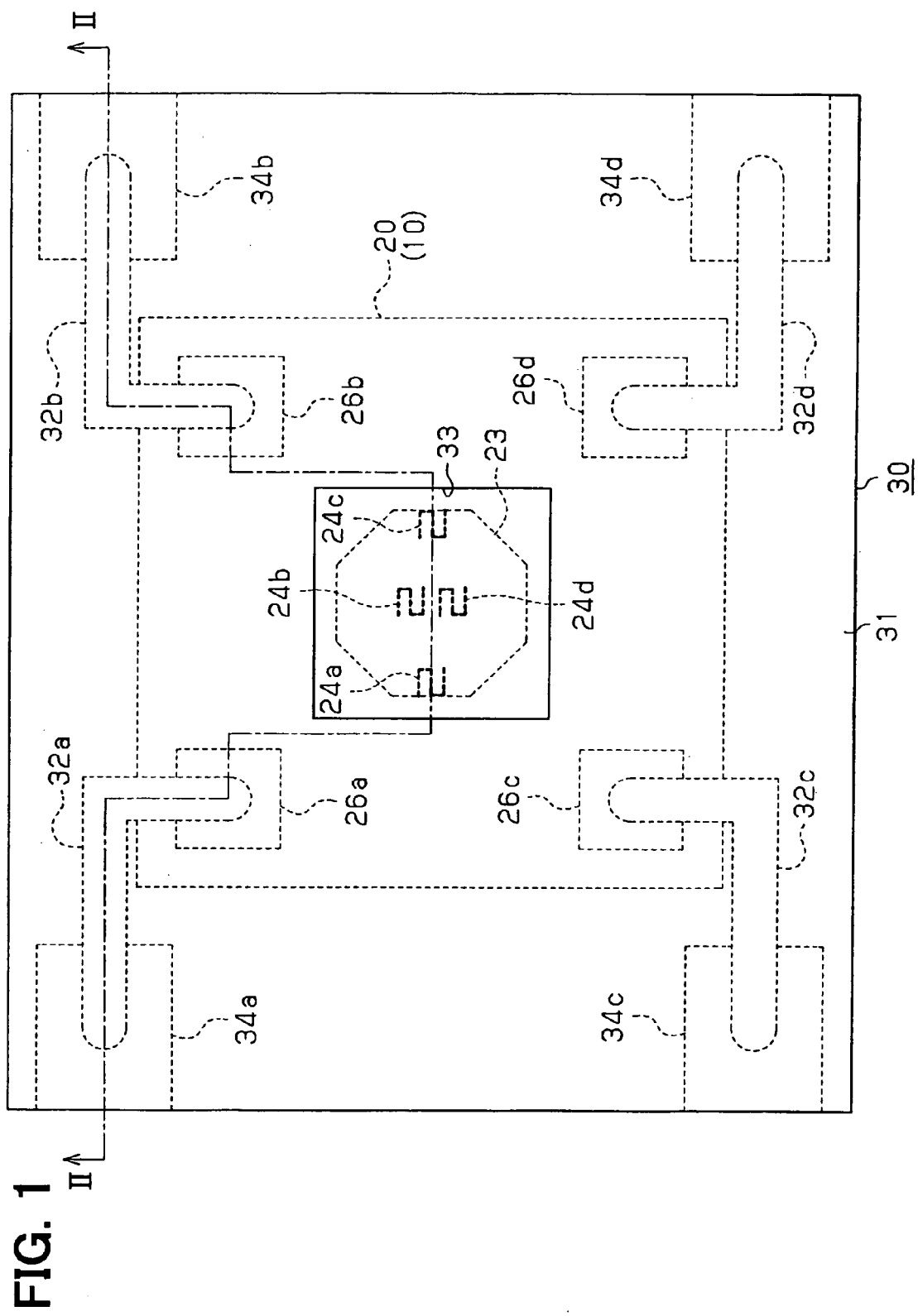
FIG. 1 is a plan view of a pressure sensor according to the first embodiment of the present invention.

The preferred embodiments of the present invention will be explained with reference to the accompanying drawings. In the drawings, the same numerals are used for the same components and devices.

[First Embodiment]

A pressure sensor shown in FIG. 1 may be mounted to one of parts in an engine exhaust system of a vehicle for detecting exhaust gas pressures. Namely, a subject of the pressure sensor is an exhaust gas of an engine. For example, it may be used for detecting pressures in an emission gas recirculating system, or for detecting pressures on an inlet side and an outlet side of a diesel particulate filter (DPF) that is an exhaust emission filter for a diesel vehicle in the same manner shown in FIG. 15.

Figure 2:
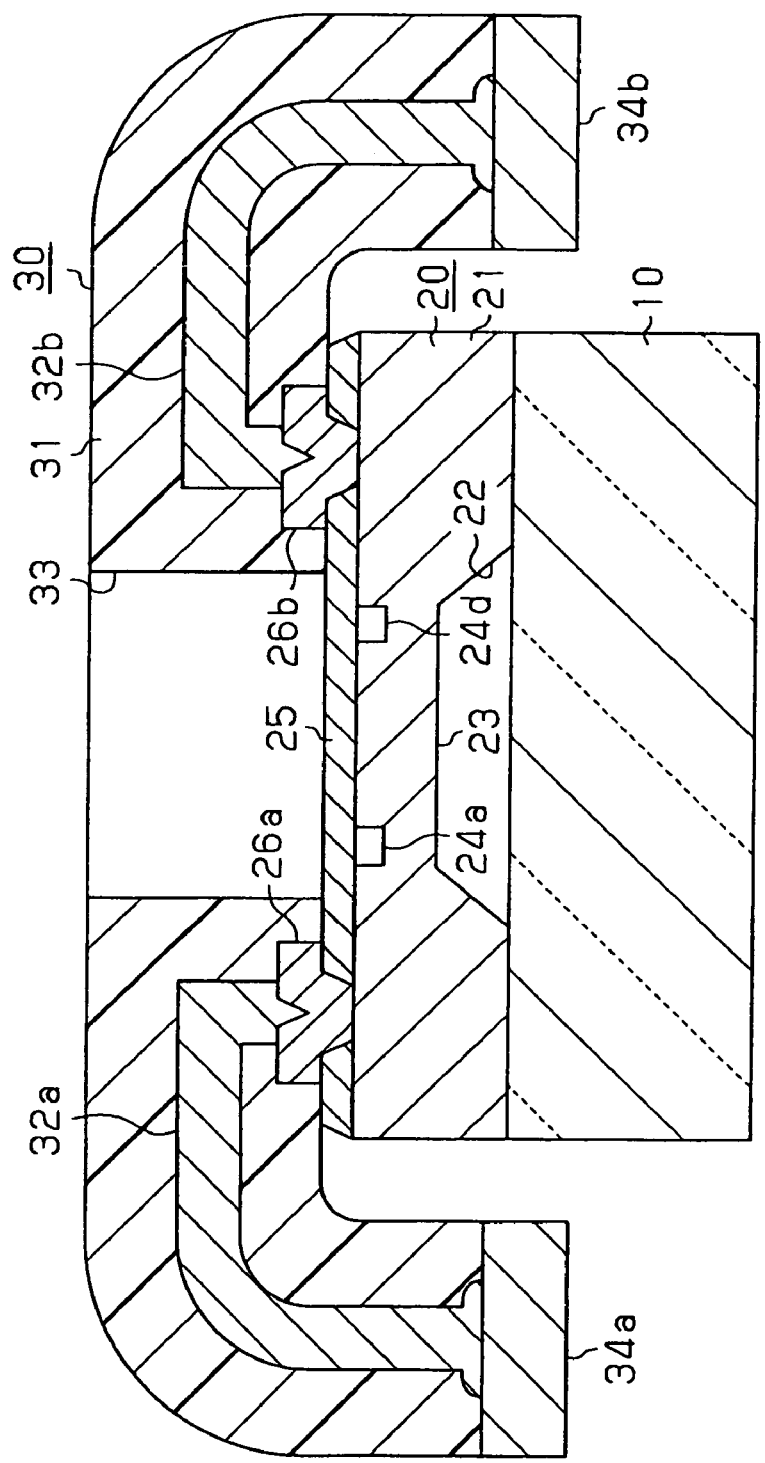
FIG. 2 is a cross-sectional view of the pressure sensor of FIG. 1 sectioned by the II-II line according to the first embodiment.
Figure 5:
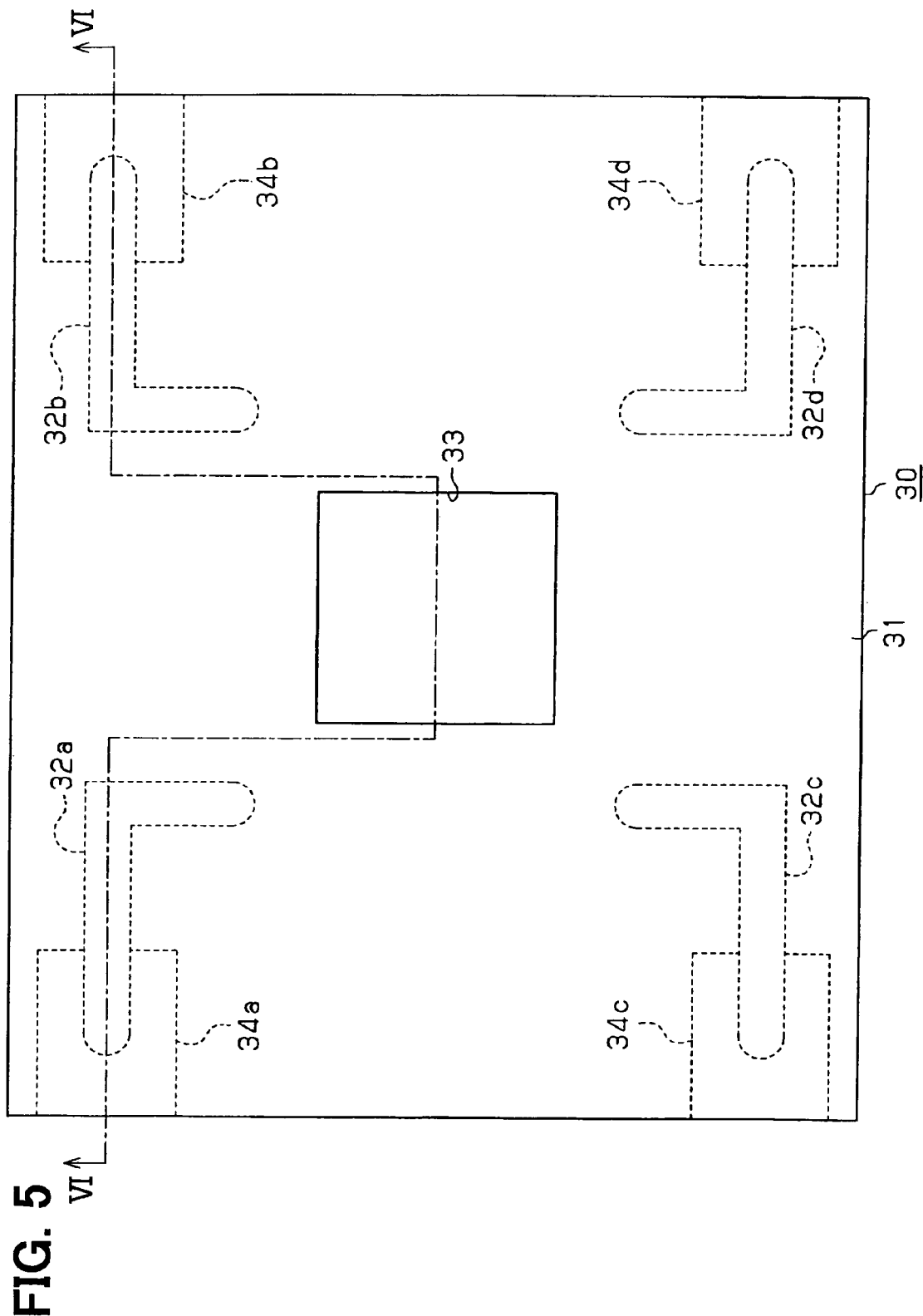
FIG. 5 is a plan view of a flexible printed circuit board according to the first embodiment.

A cross-sectional view of the pressure sensor sectioned by the II—II line in FIG. 1 is shown in FIG. 2. A flexible printed circuit board (FPC) 30 shown in FIG. 5 is press-fitted to an upper surface of a quadrangle pressure sensor chip 20. The FPC 30 includes a thermoplastic resin sheet 31 and wiring patterns 32a, 32b, 32c, 32d that are formed within the resin sheet 31 and sealed.

Figure 3:
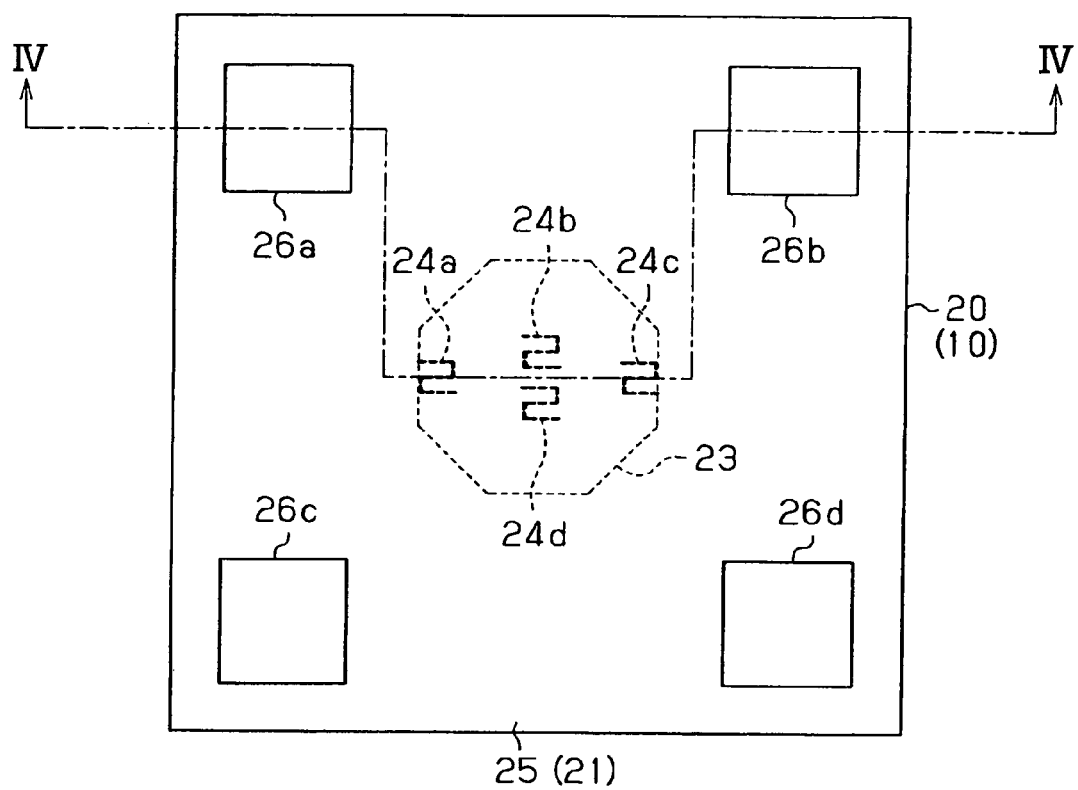
FIG. 3 is a plan view of a pressure sensor chip according to the first embodiment.
Figure 4:
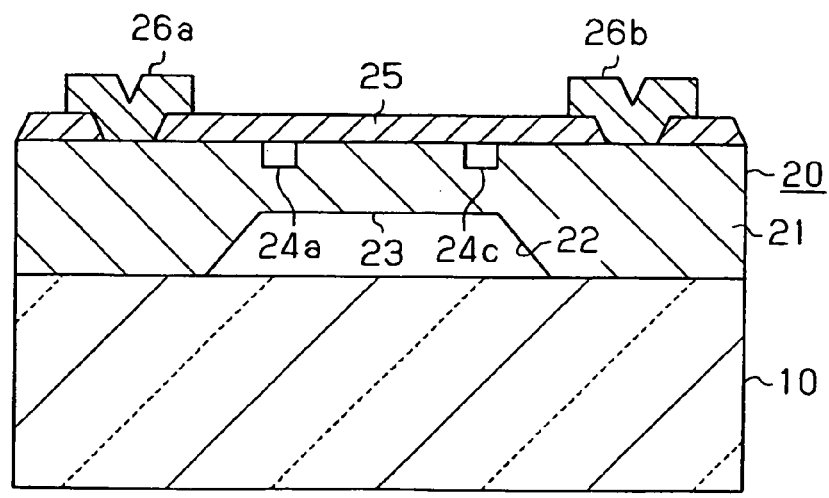
FIG. 4 is a cross-sectional view of the pressure sensor chip of FIG. 3 sectioned by the IV—IV line according to the first embodiment.

A top views of the pressure sensor around the sensor chip 20 is shown in FIG. 3 and a cross-sectional view of the pressure sensor around the sensor chip 20 sectioned by the VI—VI line in FIG. 3 is shown in FIG. 4. The pressure sensor chip 20 is mounted on a glass base 10. The pressure sensor chip 20 has a 110 plane silicon chip as its semiconductor substrate 21. A recess 22 is formed in the center of the substrate 21 opening on the bottom surface. Namely, the thickness of the substrate 21 is small in a portion in which the recess 22 is formed, and this small thickness portion is a diaphragm 23. The diaphragm 23 takes the shape of an octagon when viewed from the bottom.

A chamber defined by the glass base 10 and the recess 22 when the sensor chip 20 is fixed to the glass base 10 is a reference pressure chamber. The chamber may be used as a vacuum chamber. Gages 24a, 24b, 24c, 24d are arranged at appropriate positions within the diaphragm 23. The positions may be determined based on stress analysis. The gages 24a–24d are formed with impurity diffused layers, more specifically, p-type impurity diffused layers formed on n-type silicon substrates. A bridge circuit is formed in the sensor chip 20 using the gages 24a–24d. Stresses to the diaphragm 23 vary according to differences between forces applied to the surfaces of the diaphragm 23. Resistances of the gages 24a–24d vary according to the variations in the stresses due to piezoresistance effect, and the variations in the resistance are detected by the bridge circuit.

The surface of the semiconductor substrate 21 is covered with an insulating film 25, which is a silicon oxide film. Aluminum pads 26a, 26b, 26c, 26d are formed on the insulating film 25 adjacent to corners of the semiconductor substrate 21. The pads 26a–26d are made of aluminum thin films. Constant current is passed to the bridge circuit via the pads 26a–26d and pressure signals are outputted to an external circuit via the pads 26a–26d. Nickel plating films are formed on the surfaces of the pads 26a–26d and gold plating films are formed on the nickel plating films to make the pads 26a–26d solderable.

Figure 6:
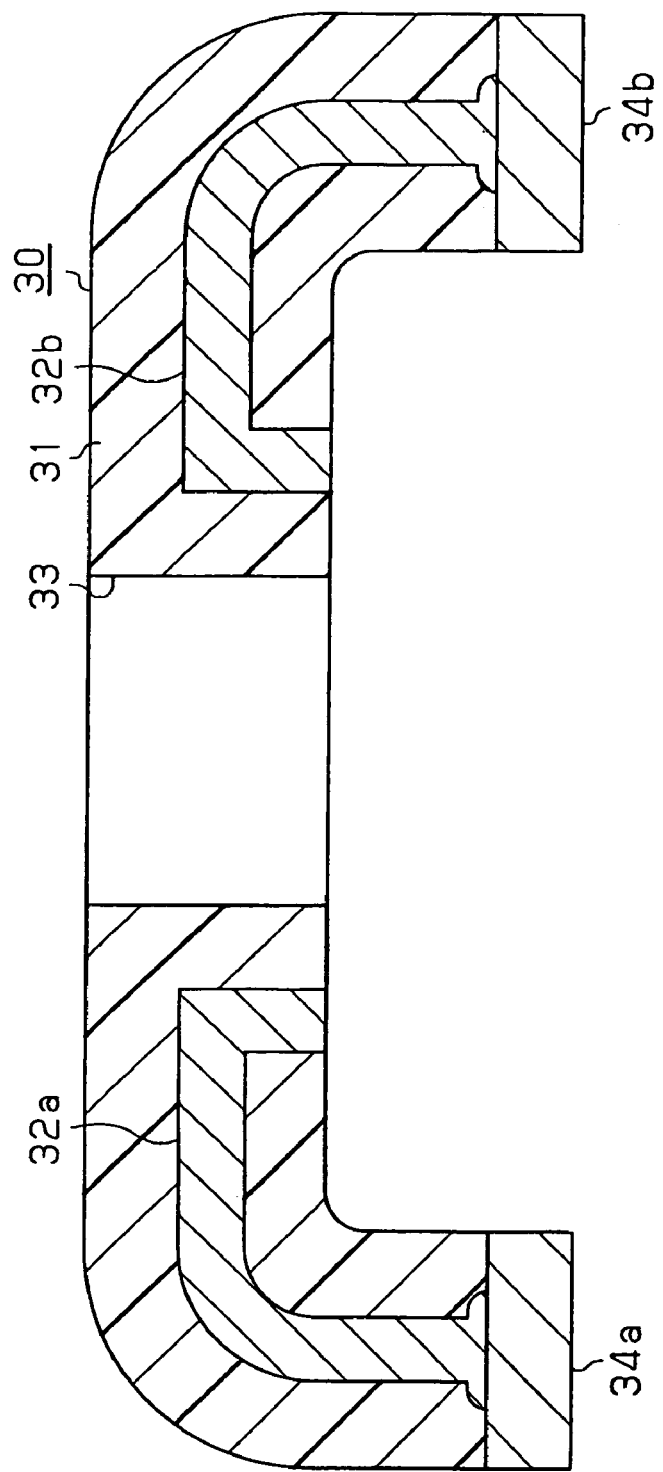
FIG. 6 is a cross-sectional view of the flexible printed circuit board of FIG. 5 sectioned by the VI—VI line according to the first embodiment.

A top view of the FPC 30 is shown in FIG. 5 and a cross-sectional view of the FPC 30 sectioned by the IV—IV line in FIG. 5 is shown in FIG. 6. The FPC 30 is formed in a quadrangle plate. The wiring patterns 32a, 32b, 32c, 32d, which are conductor patterns, are molded with the resin sheet 31. The resin sheet 31 has flexibility and electrical isolation. The resin sheet 31 may be made of polyester or polyimide. The wiring patterns 32a–32d may be formed with cupper. A quadrangle through-hole 33 is provided in the center of the FPC 30, that is, the resin sheet 31. The through-hole 33 is provided so that a portion of the sensor chip 20 in which the diaphragm 23 is formed is bared. The wiring patterns 32a–32d extend from areas around the through-hole 33 to areas away from the through-hole 33.

An inner end of each wiring pattern 32a, 32b, 32c, 32d is bared at the bottom surface of the resin sheet 31. The outer end of each wiring pattern 32a, 32b, 32c, 32d is also bared, and connected with a connecting conductor 34a, 34b, 34c, 34d. The FPC 30 is produced by sealing the multiple wiring patterns 32a, 32b, 32c, 32d, formed by patterning, with the resin sheet 31. The FPC 30 is arranged on the sensor chip 20, and the resin sheet 31 is fixed to the sensor chip 20 via thermocompression bonding.

Referring to FIGS. 1 and 2, the wiring patterns 32a–32d are connected to the respective pads 26a–26d by soldering. More specifically, solder paste is applied to the inner bare portions of the wiring patterns 32a–32d. The FPC 30 is arranged on the sensor chip 2, and the resin sheet 31 is fixed to the sensor chip 20 by thermocompression bonding. During the thermocompression bonding, the ends of the wiring patterns 32a–32d are soldered to the respective pads 26a–26d. The soldered junctions are sealed with the resin sheet 31. The diaphragm 23 is exposed via the through-hole 33. The upper surface of the sensor chip 20 is covered with the FPC 30 except for the portion in which the diaphragm 23 is formed. Namely, the FPC 30 has the through-hole 33 in the portion located above the diaphragm 23, and electrically connects the wiring patterns 32a–32d. With this configuration, the pressure sensor can provide high sensitivity and high reliability.

The resin sheet 31 is fixed to the sensor chip 20 by thermocompression in a condition that the diaphragm 23 is bared. Furthermore, the wiring patterns 32a–32d are connected to the pads 26a–26d, and the junctions between the wiring patterns 32a–32d and the pads 26a–26d are sealed with the resin sheet 31. Namely, the pads 26a–26d are electrically connected with the wiring patterns 32a–32d, and the electrical junctions and the wiring patterns 32a–32d are sealed with the resin sheet 31.

With this configuration, the electrical junctions and the wiring patterns 32a–32d are protected from corrosion. This corrosion protective structure can provide higher resistance to corrosion in comparison with corrosion protective structures in which pads of pressure sensor chips and bonding wires are sealed with filling materials. Moreover, pressure detection can be performed with high accuracy because the resin sheet 31 is press-fitted to the sensor chip 20 while the diaphragm 23 is bared.

The pressure sensor with the above-described structure provides high corrosion resistance and high accuracy in pressure detection although it is easily produced only by press-fitting the resin sheet 31 to the sensor chip 20. The pressure sensor is effective when it is used for detecting pressure of exhaust gases from an engine because the wiring patterns are formed in the FPC 30 and it has high corrosion to acid fluid. In an exhaust system of a gasoline-powered vehicle, the pressure sensor is exposed to the exhaust gases, which includes acid fluid, and the pressure of the exhaust gases is applied to the sensor chip 20. More specifically, the sensor chip 20 is exposed to corrosive fluid during pressure detection in a corrosive atmosphere of the engine gas recirculating system. Bonding pads and bonding wires have low corrosion resistance when they are made of aluminum as in the related arts.

However, the pads 26a–26d and the wiring patterns 32a–32d are sealed with the resin sheet 21 and not exposed to the corrosive atmosphere while maintaining the pressure detection sensitivity by providing the thorough-hole 33 to bare the diaphragm 23. Therefore, the pressure sensor can accurately detect pressures in the corrosive atmosphere. The pads 26a–26d and the wiring patterns 32a–32d are protected from corrosion with the FPC 30 while the pressure detection sensitivity and reliability of the wiring patterns 32a–32d are maintained even when the sensor chip 20 is used in a corrosive atmosphere.

[Second Embodiment]

Figure 7:
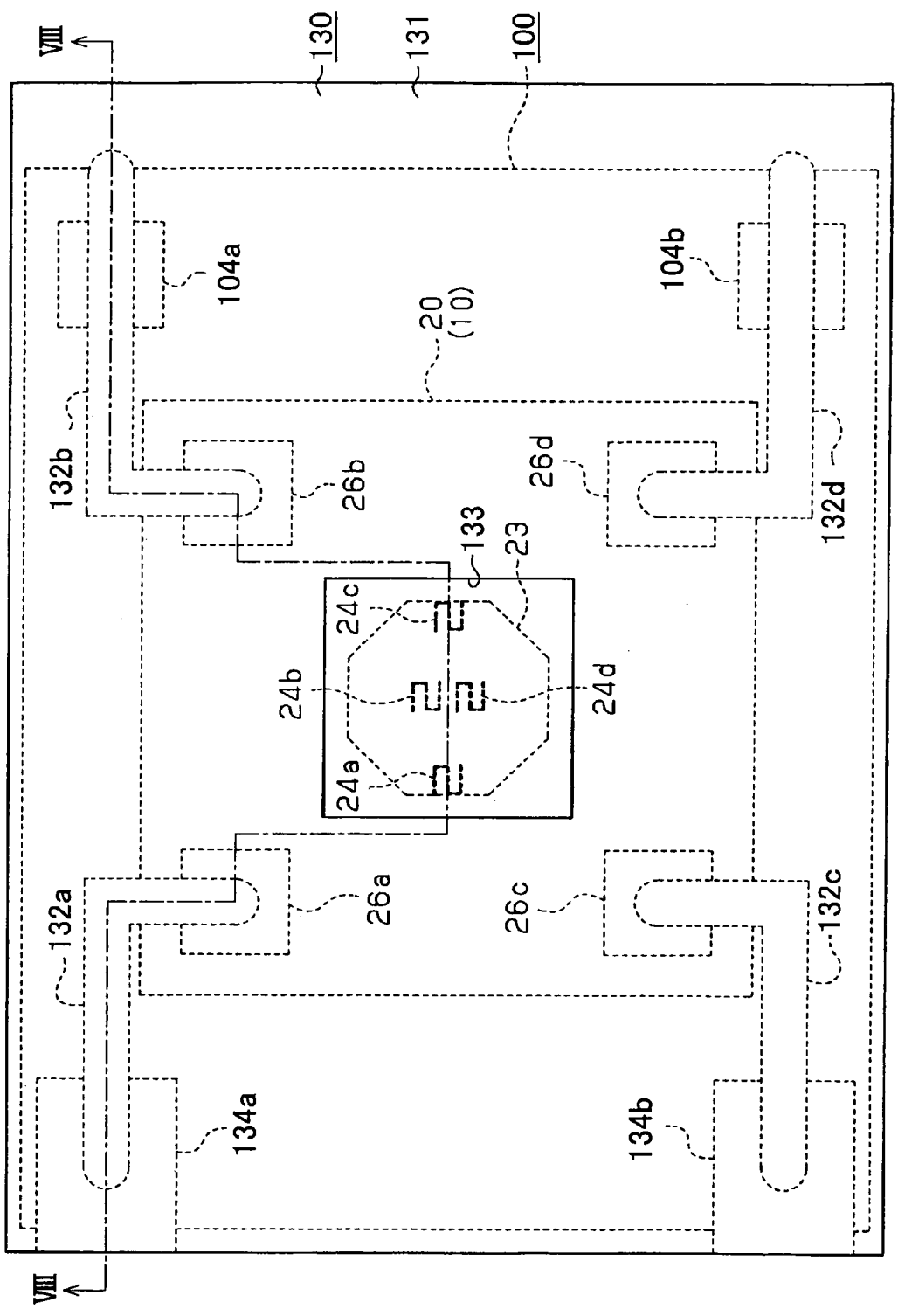
FIG. 7 is a plan view of a pressure sensor according to the second embodiment of the present invention.
Figure 8:
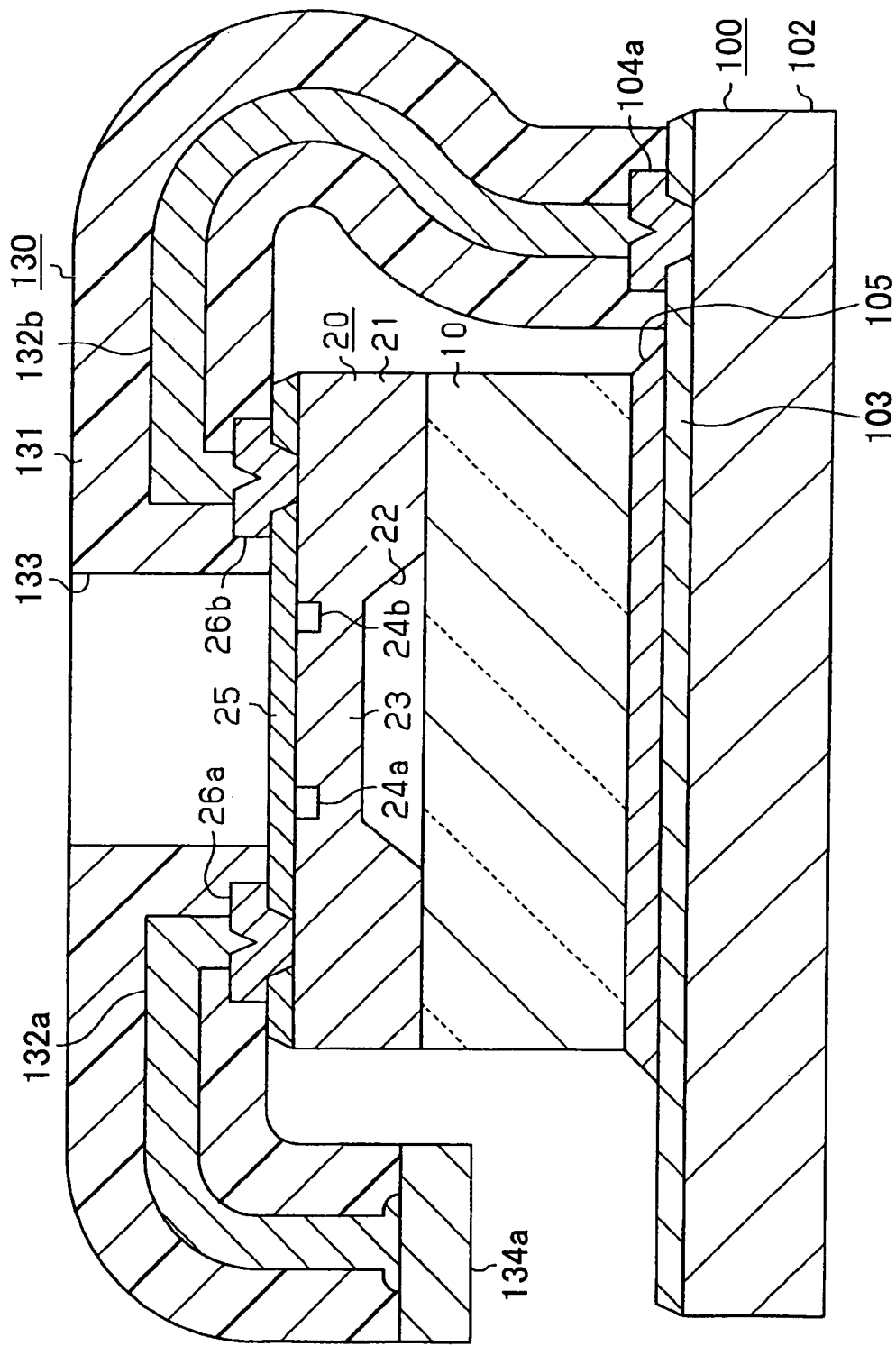
FIG. 8 is a cross-sectional view of the pressure sensor of FIG. 7 sectioned by the VIII—VIII line according to the second embodiment.
Figure 15:
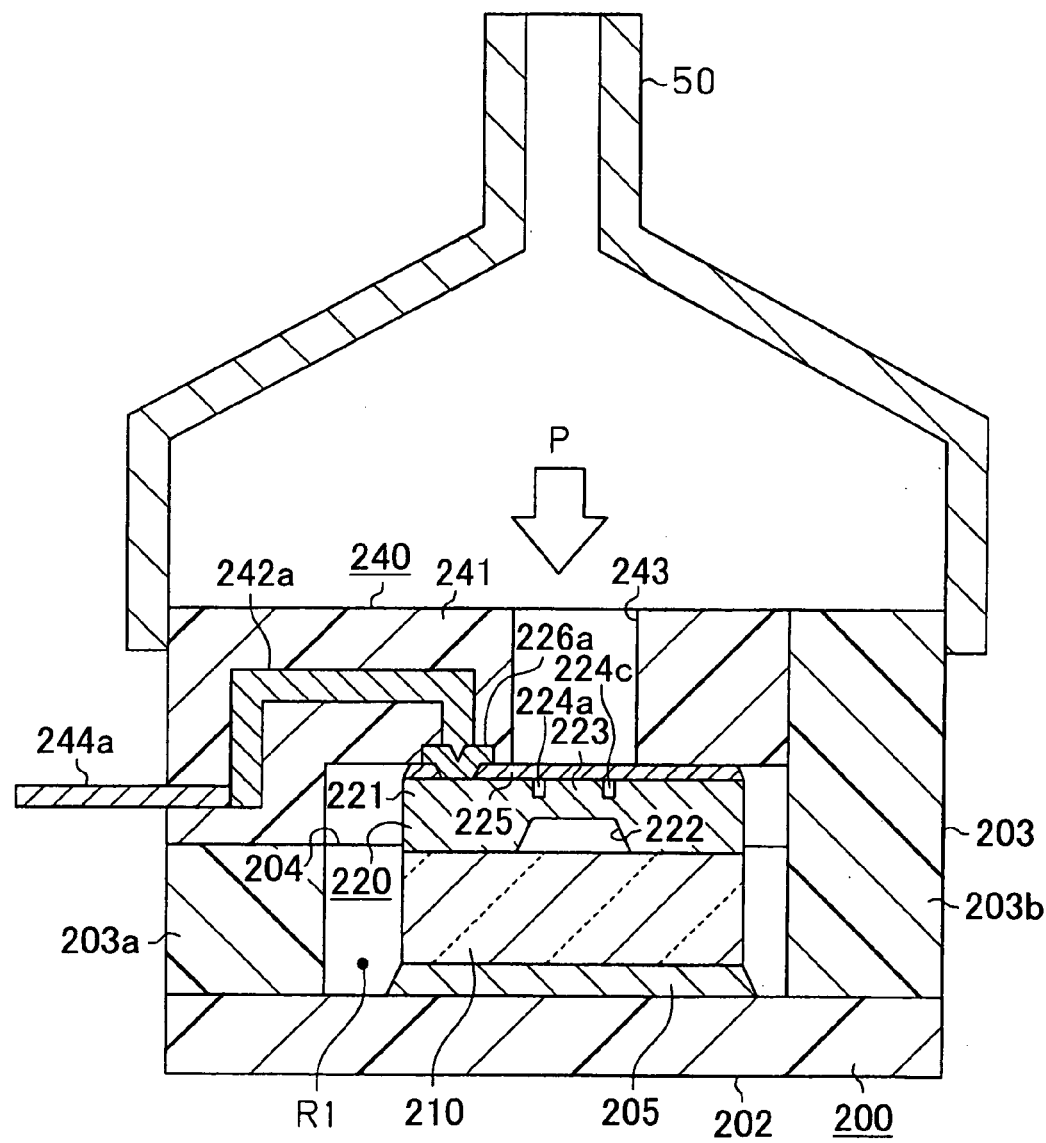
FIG. 15 is a cross-sectional view of the pressure sensor of FIG. 14 with a pressure guiding pipe according to the third embodiment.

A pressure sensor shown in FIG. 7 may be mounted to one of parts in an engine exhaust system of a vehicle for detecting exhaust gas pressures in the same manner shown in FIG. 15. A cross-sectional view of the pressure sensor sectioned by the VIII—VIII line in FIG. 7 is shown in FIG. 8. The pressure sensor chip 20 is mounted on the glass base 10 that is mounted on a circuit chip 100. The sensor chip 20 is electrically connected to the circuit chip 100 via a flexible printed circuit board (FPC) 130. The FPC 130 includes a thermoplastic resin sheet 31 and wiring patterns 132a, 132b, 132c, 132d that are formed within the resin sheet 131 and sealed.

Figure 9:
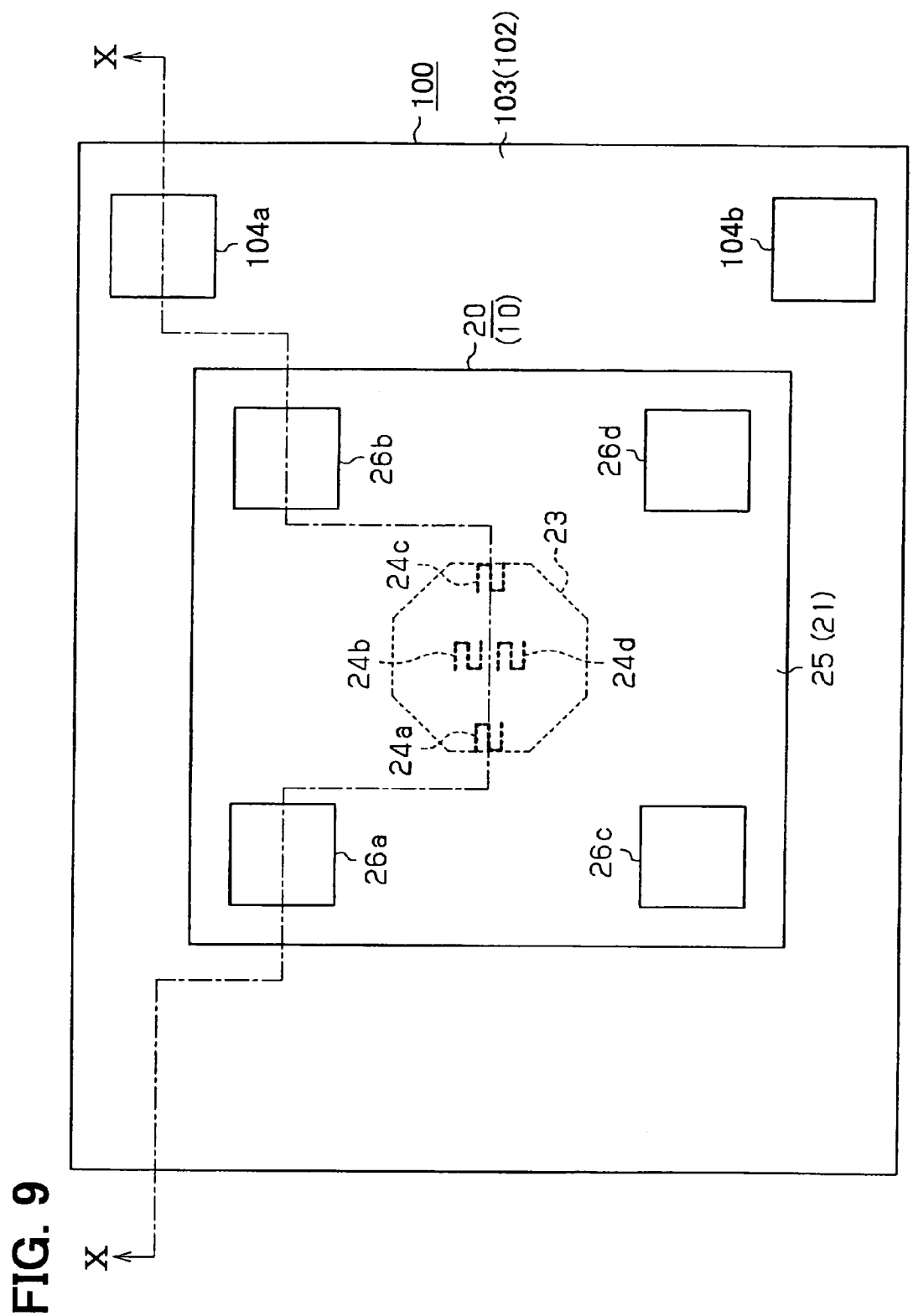
FIG. 9 is a plan view of a pressure sensor chip according to the second embodiment.
Figure 10:
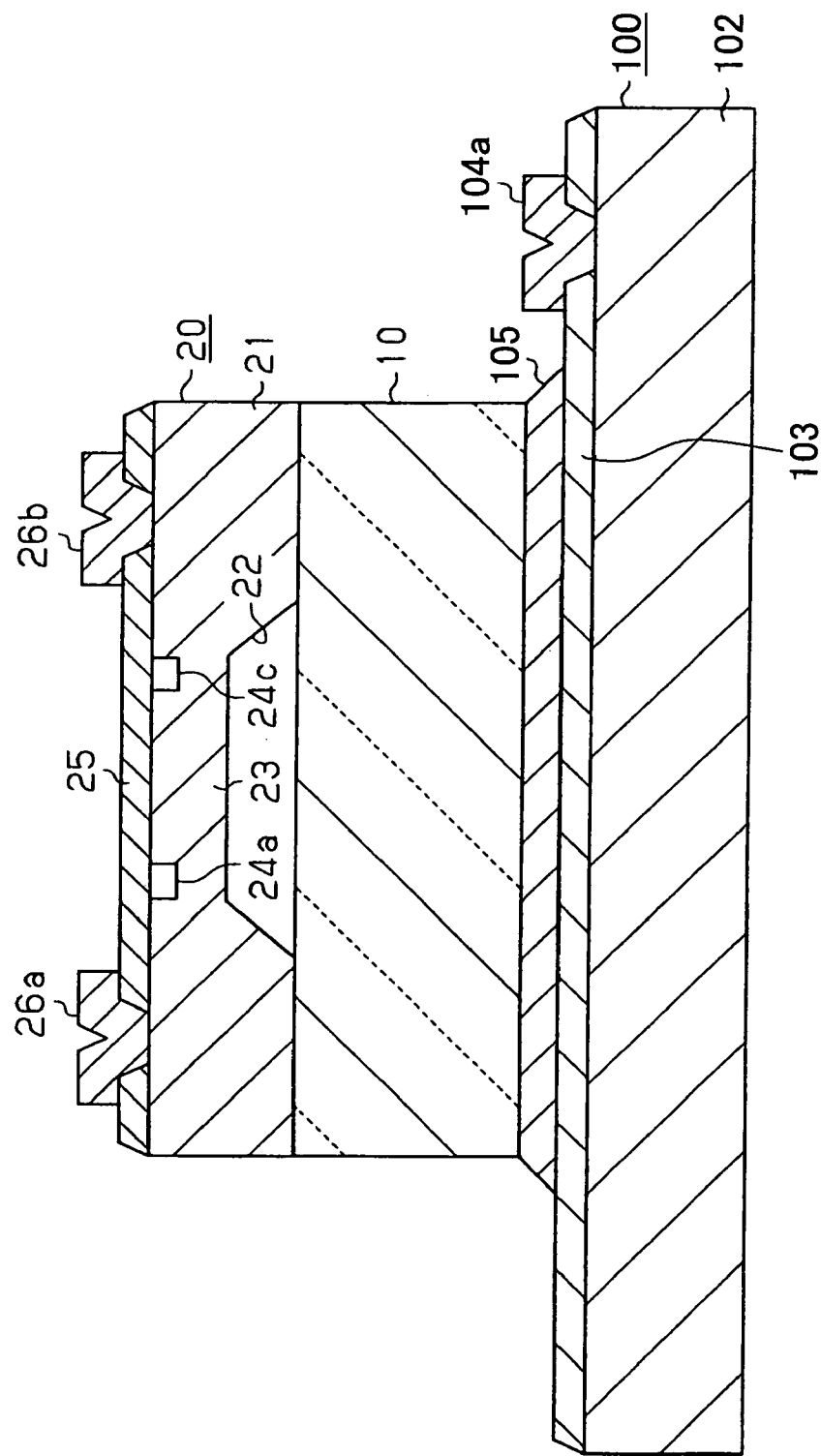
FIG. 10 is a cross-sectional view of the pressure sensor chip of FIG. 9 sectioned by the X—X line according to the second embodiment.

A top views of the pressure sensor without the FPC 130 is shown in FIG. 9 and a cross-sectional view of the pressure sensor sectioned by the X—X line in FIG. 9 is shown in FIG. 10. The circuit chip 100 is formed in a quadrangle plate. In the circuit chip 100, a semiconductor substrate 120 includes various devices that form circuits including an amplifier circuit. A surface of the semiconductor substrate 120 is coated with an insulating film 130, which is a silicon oxide film. Aluminum pads 134a, 134b, which are made of aluminum thin films, are formed on the insulating film 130 adjacent to corners of the semiconductor substrate 120. The circuit chip 100 is electrically connectable to the circuits in the semiconductor substrate 120 via the aluminum pads 134a, 134b. Nickel plating films are formed on the surfaces of the pads 134a, 134b and gold plating films are formed on the nickel plating films to make the pads 134a, 134b solderable.

The glass base 10 is fixed to the circuit chip 100 around the center of the circuit chip 100 with an adhesive 150. The sensor chip 20 is fixed to the top surface of the glass base 10. The glass base 10 and the sensor chip 20 are provided substantially in the same dimension. The dimension is smaller than that of the circuit chip 100. The sensor chip 20 is fixed on the circuit chip 100 such that the pads 134a, 134b are bared.

The pressure sensor chip 20 has a 110 plane silicon chip as its semiconductor substrate 21. A recess 22 is formed in the center of the substrate 21 with an opening at the bottom surface. Namely, the thickness of the substrate 21 is small in a portion in which the recess 22 is formed, and this small thickness portion is a diaphragm 23. The diaphragm 23 takes the shape of an octagon when viewed from the bottom.

A chamber defined by the glass base 10 and the recess 22 when the sensor chip 20 is fixed to the glass base 10 is a reference pressure chamber. The chamber may be used as a vacuum chamber. Gages 24a, 24b, 24c, 24d are arranged at appropriate positions within the diaphragm 23. The positions may be determined based on stress analysis. The gages 24a–24d are formed with impurity diffused layers, more specifically, p-type impurity diffused layers formed on n-type silicon substrates. A bridge circuit is formed in the sensor chip 20 using the gages 24a–24d. Stresses to the diaphragm 23 vary according to differences between forces applied to the surfaces of the diaphragm 23. Resistances of the gages 24a–24d vary according to the variations in the stresses because of piezoresistance effect, and the variations in the resistance are detected by the bridge circuit.

The surface of the semiconductor substrate 21 is covered with an insulating film 25, which is a silicon oxide film. Aluminum pads 26a, 26b, 26c, 26d are formed on the insulating film 25 adjacent to corners of the semiconductor substrate 21. The pads 26a–26d are aluminum thin films. Constant current is passed to the bridge circuit via the pads 26a–26d and pressure signals are outputted to an external circuit via the pads 26a–26d. Nickel plating films are formed on the surfaces of the pads 26a–26d and gold plating films are formed on the nickel plating films to make the pads 26a–26d solderable. A stacking structure is established by mounting the sensor chip 20 on the circuit chip 100, and the pads 134a, 134b are formed on the top surface of the circuit chip 100 in areas other than in which the sensor chip is mounted.

Figure 11:
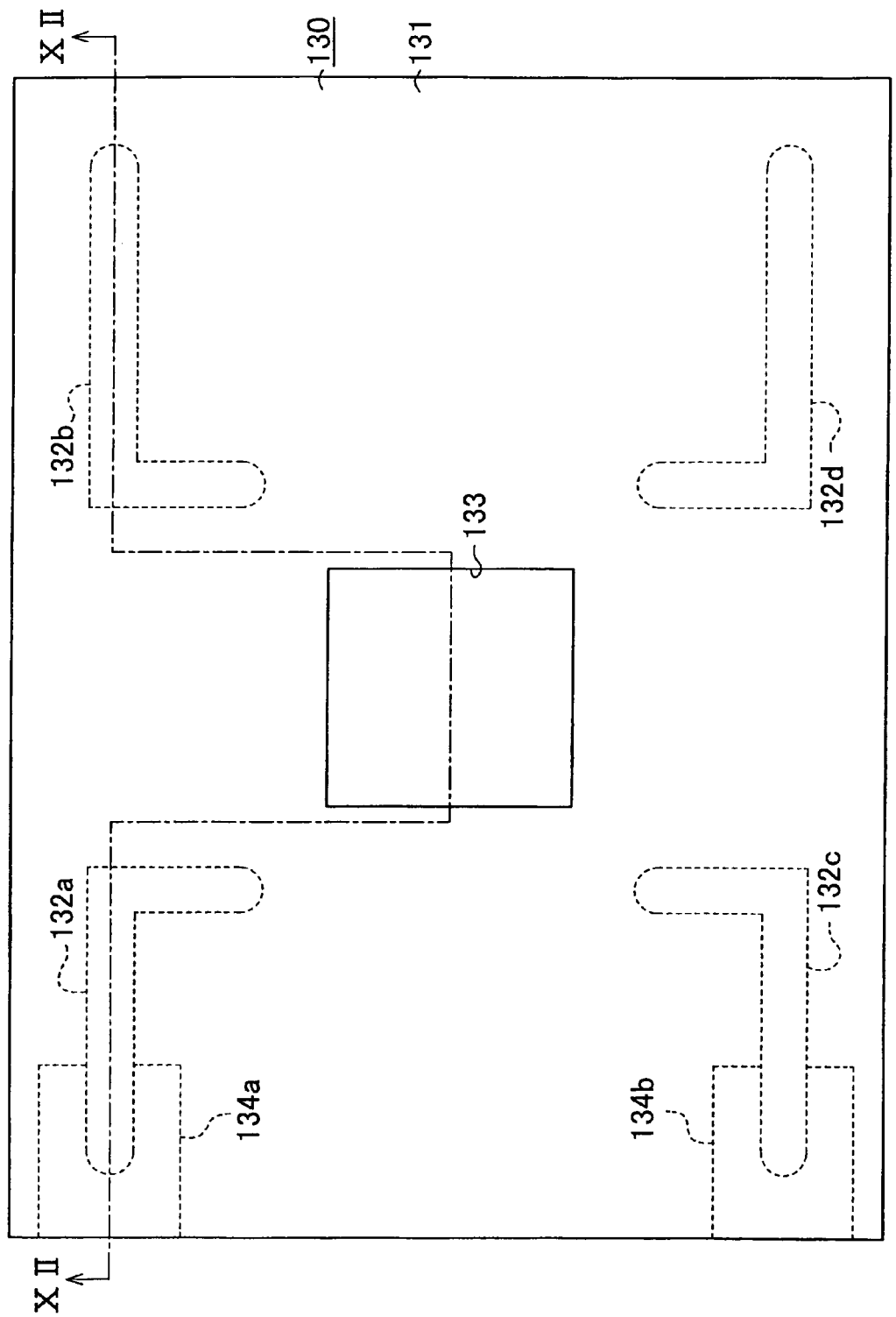
FIG. 11 is a plan view of a flexible printed circuit board according to the second embodiment.
Figure 12:
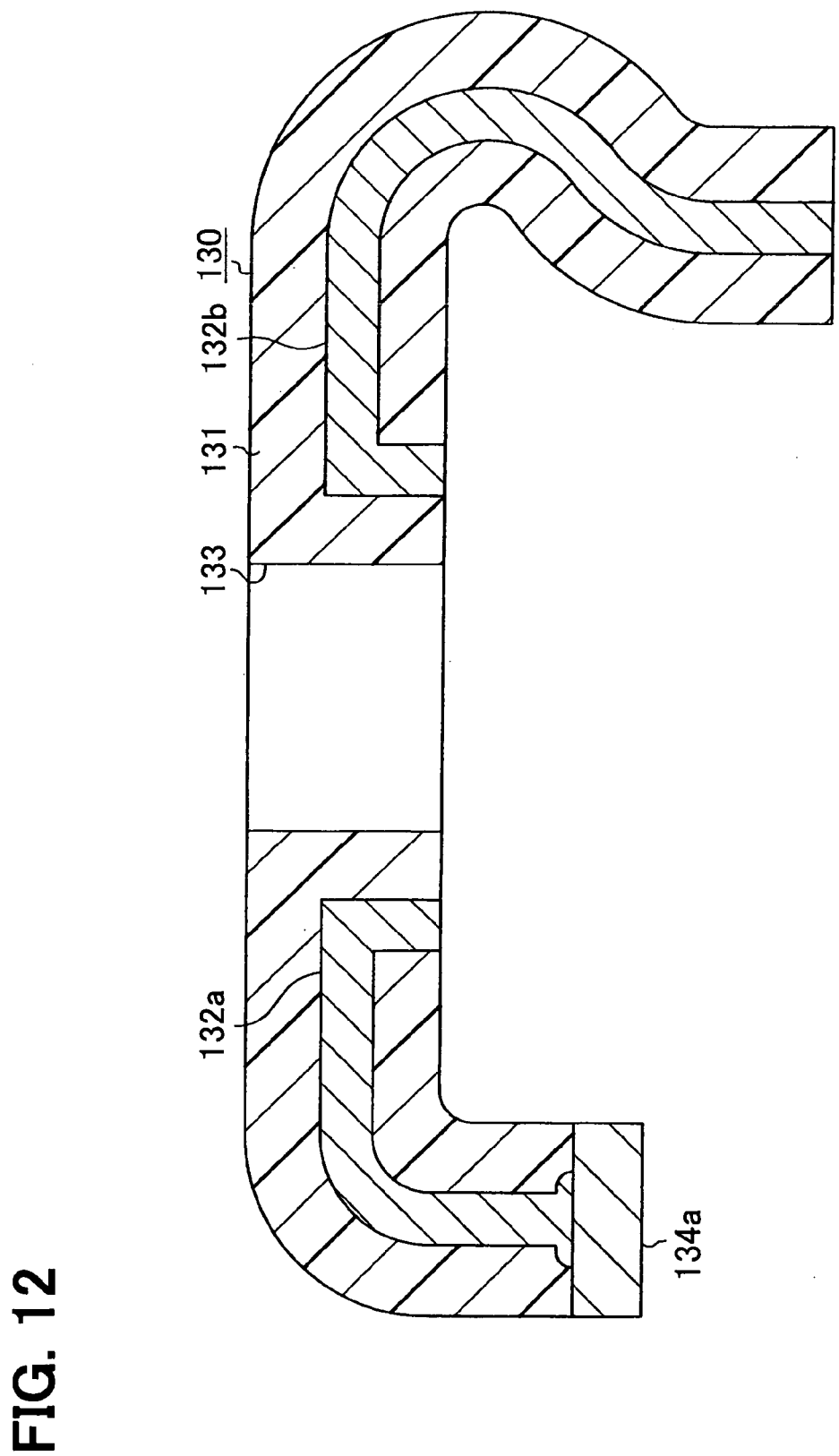
FIG. 12 is a cross-sectional view of the flexible printed circuit board of FIG. 11 sectioned by the XII—XII line according to the second embodiment.

A top view of the FPC 130 is shown in FIG. 11 and a cross-sectional view of the FPC 130 sectioned by the XII—XII line in FIG. 11 is shown in FIG. 12. The FPC 130 is formed in a quadrangle plate. The wiring patterns 132a, 132b, 132c, 132d, which are conductor patterns, are molded with the resin sheet 131. The resin sheet 131 has flexibility and electrical isolation. The resin sheet 131 may be made of polyester or polyimide. The wiring patterns 132a–132d may be formed with cupper. A quadrangle through-hole 133 is provided in the center of the FPC 130, that is, the resin sheet 131. The through-hole 133 is provided for uncovering a portion of the sensor chip 20 in which the diaphragm 23 is formed. The wiring patterns 132a–132d extend from areas around the through-hole 133 to areas away from the through-hole 133.

An inner end of each wiring pattern 132a, 132b, 132c, 132d is bared at the bottom surface of the resin sheet 131. The outer end of each wiring pattern 132a, 132b, 132c, 132d is also bared. The ends of he wiring patterns 132a, 132c are connected with connecting conductors 34a, 34c, respectively. The FPC 130 is produced by sealing the multiple wiring patterns 132a, 132b, 132c, 132d, formed by patterning, with the resin sheet 131. The FPC 130 is arranged for connecting the sensor chip 20 with the circuit chip 100, and the resin sheet 131 is fixed to the sensor chip 20 and the circuit chip 100 via thermocompression bonding.

Referring to FIGS. 7 and 8, the wiring patterns 132a–132d are connected to the respective pads 26a–26d by soldering. More specifically, solder paste is applied to the inner bare portions of the wiring patterns 132a–132d. The FPC 130 is arranged on the sensor chip 2 and the circuit chip 100, and the resin sheet 131 is fixed to the sensor chip 20 and the circuit chip 100 by thermocompression bonding. During the thermocompression bonding, the ends of the wiring patterns 132a–132d are soldered to the respective pads 26a–26d. The soldered junctions are sealed with the resin sheet 131. In the same manner, the outer ends of the wiring patterns 134a, 134b are connected to the respective pads 134a, 134b, and solder junctions between the wiring patterns 134a, 134b and the pads 134a, 134b are sealed with the resin sheet 131.

The diaphragm 23 is bared at the through-hole 133. The upper surface of the sensor chip 20 is covered with the FPC 130 except for the portion in which the diaphragm 23 is formed. Namely, the FPC 130 has a through-hole 133 in the portion located above the diaphragm 23, and electrically connects the wiring patterns 132a–132d. With this configuration, the pressure sensor can provide high sensitivity and high reliability.

The resin sheet 131 is fixed to the sensor chip 20 by thermocompression in a condition that the diaphragm 23 is bared. Furthermore, the wiring patterns 132a–132d are connected to the pads 26a–26d, and the junctions between the wiring patterns 132a–132d and the pads 26a–26d are sealed with the resin sheet 131. Namely, the pads 26a–26d are electrically connected with the wiring patterns 132a–132d, and the electrical junctions and the wiring patterns 132a–132d are sealed with the resin sheet 131.

The stacking structure is established by mounting the sensor chip 20 on the circuit chip 100, and the pads 134a, 134b are formed on the top surface of the circuit chip 100 in areas other than in which the sensor chip is mounted. The resin sheet 31 is press-fitted to the sensor chip 20 and the circuit chip 100. The wiring patterns 132a–132d are connected to the pads 26a–26d at one ends, and the wiring patterns 132a, 132d are connected to the pads 134a, 134b at another ends. The junctions are sealed with the resin sheet 31. The wiring patterns 132a–132d are sealed with the resin sheet 131. Namely, the pads 26a–26d are electrically connected with the wiring patterns 132a–132d, and the electrical junctions and the wiring patterns 132a–132d are sealed with the resin sheet 131.

With this configuration, the electrical junctions and the wiring patterns 132a–132d are protected from corrosion. This corrosion protective structure can provide higher resistance to corrosion in comparison with corrosion protective structures in which pads of pressure sensor chips and bonding wires are sealed with filling materials. Moreover, a size of the pressure sensor is reduced by mounting the sensor chip 20 on the circuit chip 100, namely, by arranging them in the stacking structure and electrically connecting them with the FPC 130, in comparison to a structure in which a sensor chip and a circuit chip are arranged in the same plane.

The above-described unique structure can make the pressure sensor highly resistive to corrosion and small in size. Furthermore, the above-described structure is easily produced, or press-fitting of the resin sheet 131 is easily performed. The diaphragm 23 is bared when the resin sheet 31 is press-fitted to the sensor chip 20 because the resin sheet 31 has the through-hole at a position corresponding to the diaphragm 23. Therefore, the pressure detection is accurately performed.

The pressure sensor is effective when it is used for detecting pressure of exhaust gases from an engine because the wiring patterns are formed in the FPC 130 and it has high corrosion to acid fluid. In an exhaust system of a gasoline-powered vehicle, the pressure sensor is exposed to the exhaust gases, which includes acid fluid, and the pressure of the exhaust gases is applied to the sensor chip 20. More specifically, the sensor chip 20 is exposed to corrosive fluid during pressure detection in a corrosive atmosphere of the engine gas recirculating system. Bonding pads and bonding wires have low corrosion resistance when they are made of aluminum as in the related arts.

However, the pads 26a–26d and the wiring patterns 132a–132d are sealed with the resin sheet 131 and not exposed to the corrosive atmosphere while maintaining the pressure detection sensitivity by providing the thorough-hole 133 to bare the diaphragm 23. Therefore, the pressure sensor can accurately detect pressures in the corrosive atmosphere. The pads 26a–26d and the wiring patterns 132a–132d are protected from corrosion with the FPC 130 while the pressure detection sensitivity and reliability of the wiring patterns 132a–132d are maintained even when the sensor chip 20 is used in a corrosive atmosphere.

[Third Embodiment]

Figure 13:
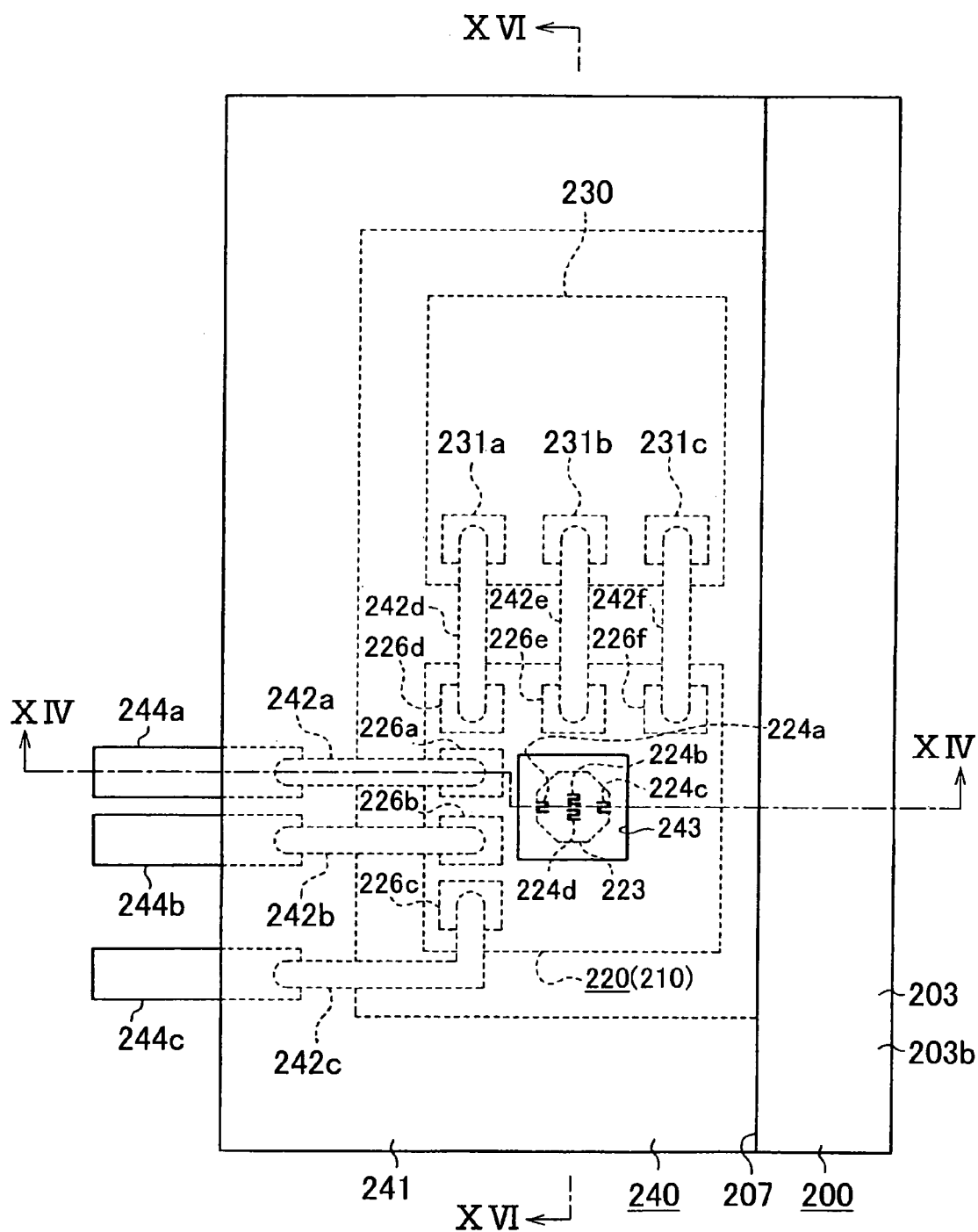
FIG. 13 is a plan view of a pressure sensor according to the third embodiment of the present invention.
Figure 14:
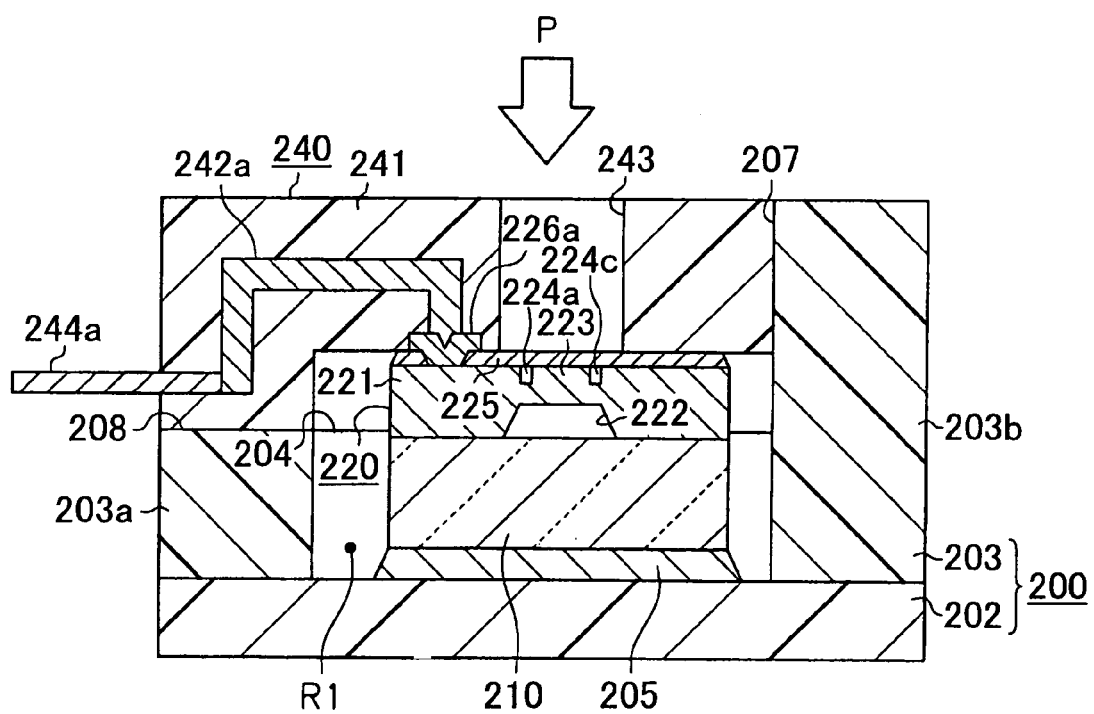
FIG. 14 is a cross-sectional view of the pressure sensor of FIG. 13 sectioned by the XIV—XIV line according to the third embodiment.

A pressure sensor shown in FIG. 13 may be mounted to one of parts in an engine exhaust system of a vehicle for detecting exhaust gas pressures. For example, the pressure sensor may by used for detecting pressure in an emission gas recirculating path under conditions that the pressure sensor is connected with a pressure guiding pipe 50 as shown in FIG. 15.

Figure 16:
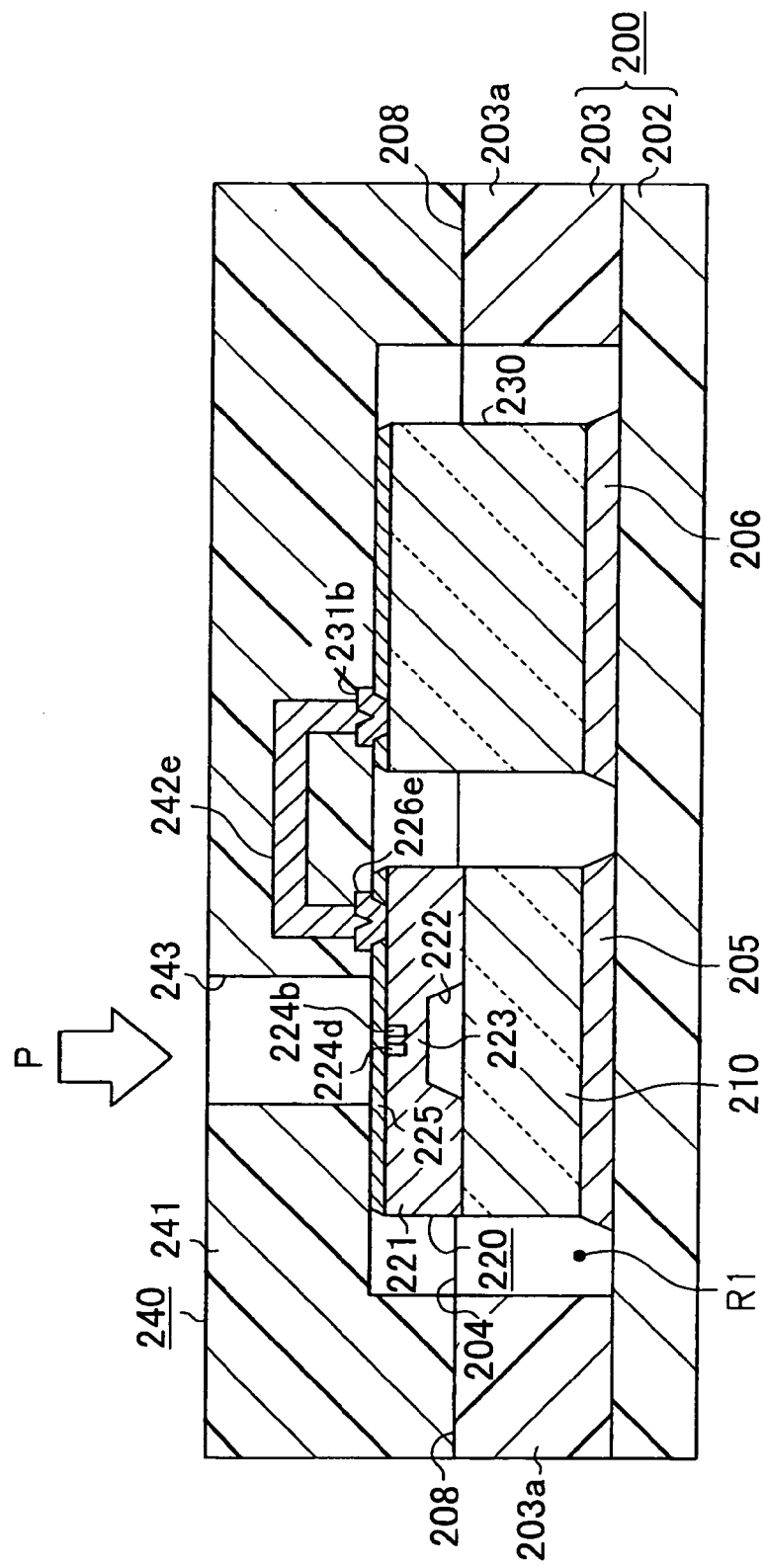
FIG. 16 is a cross-sectional view of the pressure sensor of FIG. 13 sectioned by the XVI—XVI line according to the third embodiment.

Referring to FIG. 16, the pressure sensor chip 220 is housed in a chip housing portion R1 of a plastic case 200 and fixed to the case 200 via a glass base 210. A circuit chip 230 is also housed in the chip housing portion R1 and fixed to the case 200 and fixed to the case 200. The chips 220, 230 are electrically connected with each other via a flexible printed circuit board (FPC) 240. The FPC 240 includes a thermoplastic resin sheet 241 in which wiring patterns 242a, 242b, 242c, 242d are formed. The FPC 240 covers an opening of the case 200 at the upper surface of the case 200 and closes the chip housing portion R1.

Figure 17:
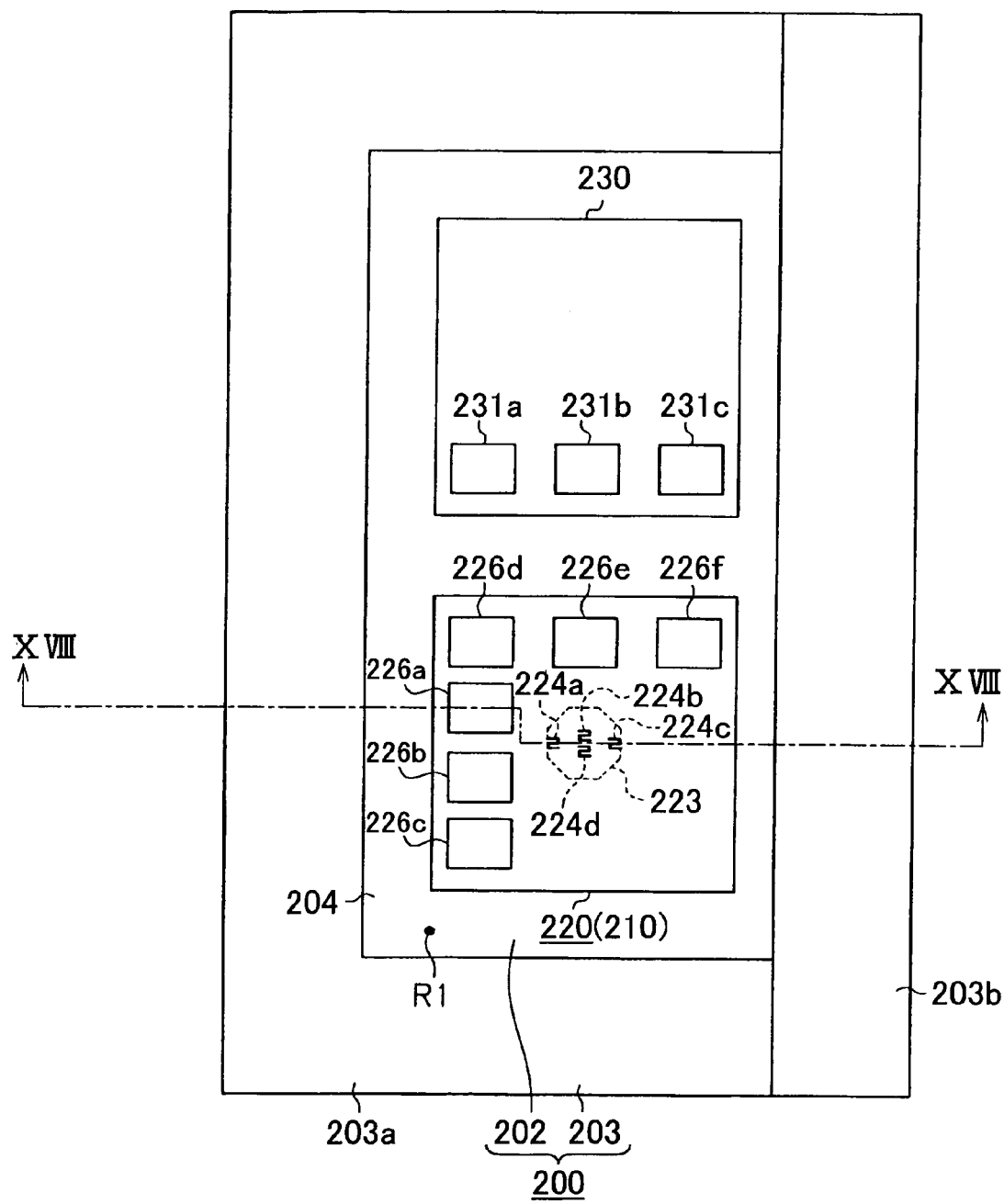
FIG. 17 is a plan view of a pressure sensor chip according to the third embodiment.
Figure 18:
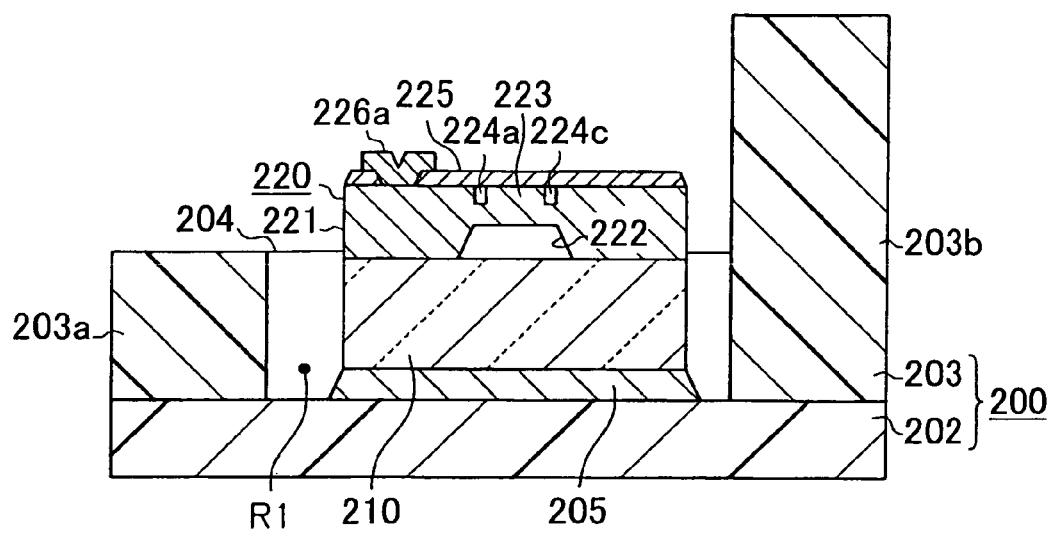
FIG. 18 is a cross-sectional view of the pressure sensor chip of FIG. 17 sectioned by the XVIII—XVIII line according to the third embodiment.

Referring to FIGS. 17 and 18, the case 200 includes a plate portion 202 and a frame portion 203. The plate portion 202 is formed in a quadrangle plate and the frame portion 203 is formed in a quadrangle frame. The frame portion 203 has four sides, one of which located on the right side and indicated with a numeral 203b in FIGS. 17 and 18 is thicker than the other sides indicated with a numeral 203a. The case 200 is constructed by fixing the plate portion 202 to the frame portion 203 to close one of the opening of the frame portion 203 with absolute contact. The plate portion 202 is fixed to the frame portion 203 with an adhesive. The chip housing portion R1 is formed inside the case 200 and an opening 204 when the plated portion 202 is fixed to the frame portion 203.

The glass base 210 is fixed to the upper surface of the plate portion 202 with an adhesive 5 inside the chip housing portion R1. The sensor chip 220 is fixed to the upper surface of the glass base 210. The glass base 210 and the sensor chip 220 are provided substantially in the same width and depth.

The pressure sensor chip 220 has a 110 plane silicon chip as its semiconductor substrate 221. A recess 222 is formed in the center of the substrate 221 with an opening at the bottom surface. Namely, the thickness of the substrate 221 is small in a portion in which the recess 222 is formed, and this small thickness portion is a diaphragm 223. The diaphragm 223 takes the shape of an octagon when viewed from the bottom.

A chamber defined by the glass base 210 and the recess 222 when the sensor chip 220 is fixed to the glass base 210 is a reference pressure chamber. The chamber may be used as a vacuum chamber. Gages 224a, 224b, 224c, 224d are arranged at appropriate positions within the diaphragm 223. The positions may be determined based on stress analysis. The gages 224a–224d are formed with impurity diffused layers, more specifically, p-type impurity diffused layers formed on n-type silicon substrates. A bridge circuit is formed in the sensor chip 220 using the gages 224a–224d. Stresses to the diaphragm 223 vary according to differences between forces applied to the surfaces of the diaphragm 223. Resistances of the gages 224a–224d vary according to the variations in the stresses because of piezoresistance effect, and the variations in the resistance are detected by the bridge circuit.

The surface of the semiconductor substrate 221 is covered with an insulating film 225, which is a silicon oxide film. Aluminum pads 226a, 226b, 226c, 226d are formed on the insulating film 225 adjacent to corners of the semiconductor substrate 221. The pads 226a–226d are aluminum thin films. Constant current is passed to the bridge circuit via the pads 226a–226d and pressure signals are outputted to an external circuit via the pads 226a–226d. Nickel plating films are formed on the surfaces of the pads 226a–226d and gold plating films are formed on the nickel plating films to make the pads 226a–226d solderable.

The circuit chip 230 is fixed to the upper surface of the plate portion 202 with an adhesive 6 adjacent to the sensor chip 220 within the chip housing portion R1. The circuit chip 230 contains various devices that form circuits including an amplifier circuit. Aluminum pads 231a, 231b, 231c, 231d, which are aluminum thin films, are formed on the circuit chip 230. The sensor chip 220 is electrically connectable to the circuits in the circuit chip 230 via the aluminum pads 231a–231d. Nickel plating films are formed on the surfaces of the pads 231a–231d and gold plating films are formed on the nickel plating films to make the pads 231a–231d solderable.

Figure 20:
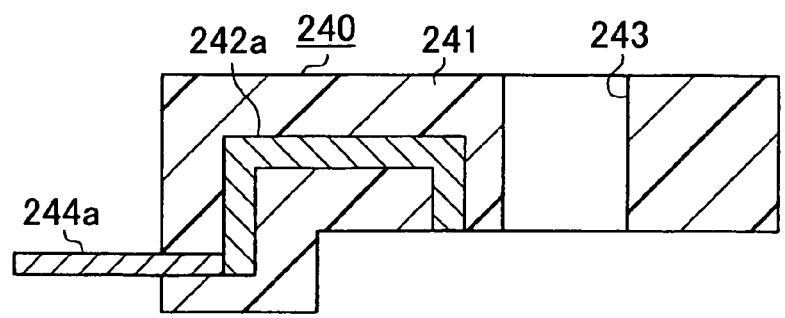
FIG. 20 is a cross-sectional view of the flexible printed circuit board of FIG. 19 sectioned by the XX—XX line according to the third embodiment.
Figure 19:
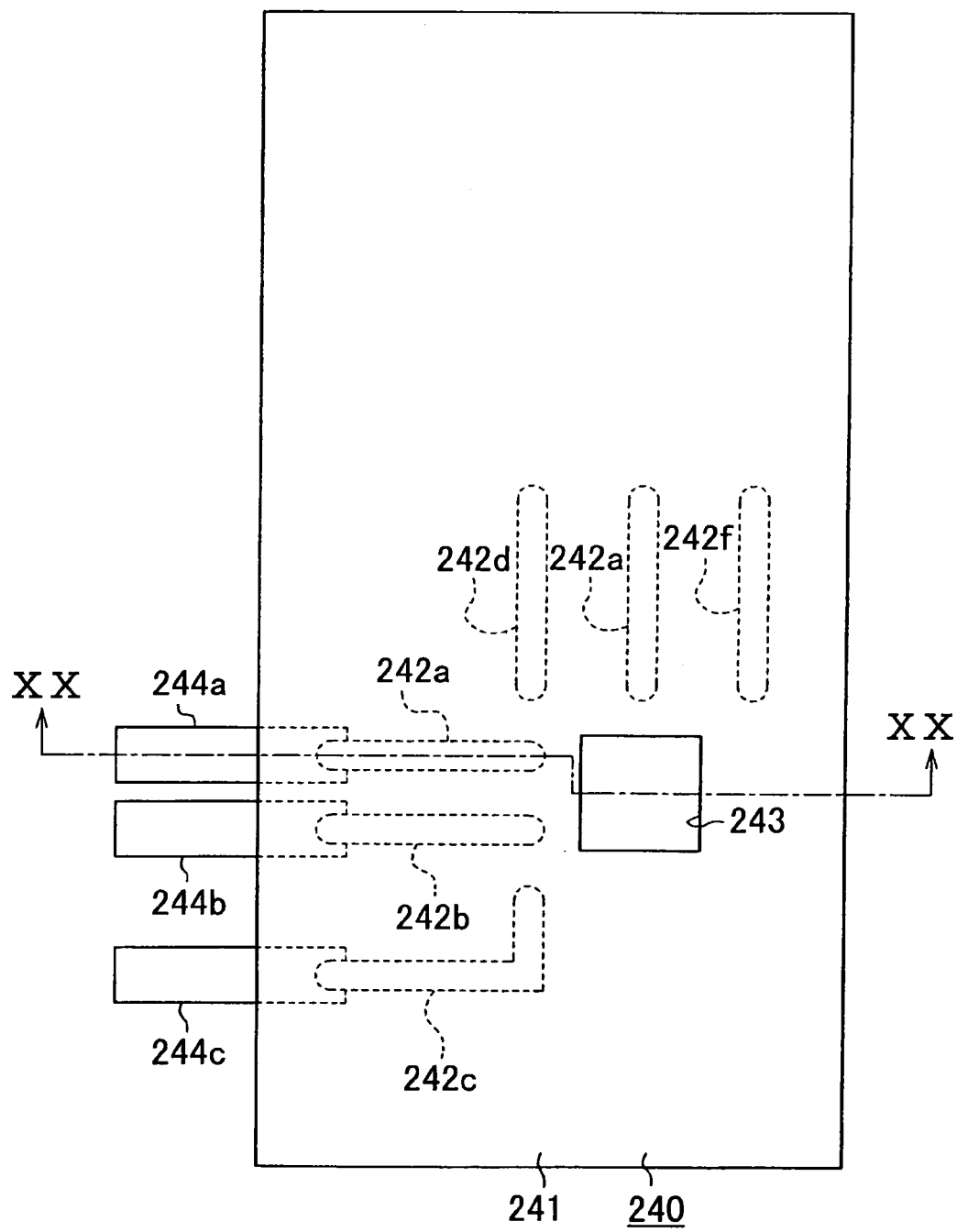
FIG. 19 is a plan view of a flexible printed circuit board according to the third embodiment.

A top view of the FPC 240 is shown in FIG. 19 and a cross-sectional view of the FPC 240 sectioned by the XX—XX line in FIG. 19 is shown in FIG. 20. The FPC 240 is formed in a quadrangle plate. The FPC 240 includes thermoplastic resin sheet 241, the first wiring patterns 242a, 242b, 242c, and the second wiring patterns 242d, 242e, 242f. The wiring patterns 242a, 242b, 242c, 242d, 242e, 242f are conductor patterns molded with the resin sheet 241. The resin sheet 31 has flexibility and electrical isolation. The resin sheet 241 may be made of polyester or polyimide. The wiring patterns 342a–242f may be formed with cupper. A quadrangle through-hole 243 is provided in the center of the FPC 240, that is, the resin sheet 241. The through-hole 243 is provided for uncovering a portion of the sensor chip 220 in which the diaphragm 223 is formed. The wiring patterns 242a–242f extend from areas around the through-hole 243 to areas away from the through-hole 243.

An inner end of each wiring pattern 242a–242f is bared at the bottom surface of the resin sheet 241. The outer ends of the wiring patterns 242a, 242b, 242c are also bared, and connected with connecting conductors 244a, 244b, 244c, respectively. The FPC 240 is produced by sealing the multiple wiring patterns 242a–242f, formed by patterning, with the resin sheet 241. The sensor chip 420 and the circuit chip 430 are fixed in the chip housing portion R1 such that their surfaces on which the pads 246a–246f, 231a–231c are formed are bared at the opening 204. The resin sheet 241 is fixed to the upper surfaces of the case 200 and the chips 220, 230 by thermocompression.

The wiring patterns 242a–242f are soldered to the pads 26a–26f, 31a–31c. More specifically, solder paste is applied to the inner bare portions of the wiring patterns 242a–242f and the outer bare portions of the wiring patterns 242d, 242e, 242f. The FPC 240 is arranged on the sensor chip 220 and the circuit chip 230, and the resin sheet 241 is fixed to the sensor chip 220 and the circuit chip 230 by thermocompression bonding. During the thermocompression bonding, the ends of the wiring patterns 242a–242f are soldered to the respective pads 226a–226f, 231a–231c. The soldered junctions are sealed with the resin sheet 241. The diaphragm 223 is exposed via the through-hole 243. The upper surface of the sensor chip 220 is covered with the FPC 240 except for the portion in which the diaphragm 223 is formed. Namely, the FPC 240 has a through-hole 243 in the portion located above the diaphragm 223. With this configuration, the pressure sensor can provide high sensitivity and high reliability.

An inner wall 207 of the side 203b of the frame portion 203 and upper surfaces 208 of the other sides 203a are press-fitted to the resin sheet 241. Thus, the opening 204 of the frame portion 203, that is, the opening 204 of the chip hosing portion R1 is closed with the FPC 240.

The resin sheet 241 is fixed to the case 200 and the surface on which the pads 226a–226f are formed by thermocompression for closing the opening 204 of the chip housing portion R1. The wiring patterns 242a–242f are connected to the pads 226a–226f, and the junctions between the wiring patterns 232a–232d and the pads 226a–226d are sealed with the resin sheet 241. Namely, the pads 226a–226f are electrically connected with the wiring patterns 242a–242f, and the electrical junctions and the wiring patterns 242a–242f are sealed with the resin sheet 241.

With this configuration, the electrical junctions and the wiring patterns 242a–242f are protected from corrosion. This corrosion protective structure can provide higher resistance to corrosion in comparison with corrosion protective structures in which pads of pressure sensor chips and bonding wires are sealed with filling materials. Moreover, the sensor chip 220 is covered with the FPC 240 and the case 200. This provides further protection to the sensor chip 220 against corrosion.

The pressure sensor with the above-described structure provides high corrosion resistance and high accuracy in pressure detection. Furthermore, the above-described structure is easily produced only by press-fitting the resin sheet 241 to the sensor chip 220. The resin sheet 241 is press-fitted to the sensor chip 220 such that the diaphragm 223 is exposed via the through-hole 243. With this configuration, the pressure sensor can perform the pressure detection with high accuracy.

The circuit chip 230 is fixed in the chip housing portion R1 such that the surface on which the pads 231a–231c are formed is bared at the opening 204. The resin sheet 241 is press-fitted to the case 200 and the surfaces on which the pads 226a–226f, 231a–231c are formed to close the opening 204. The wiring patterns 242a–242f are connected to the respective pads 226a–226f, and the wiring patterns 242d–242f are connected to the respective pads 231a–231c. The joints are sealed with the resin sheet 241. Thus, the circuit chip 230 is packaged in the case 200 in the condition that it is highly protected from corrosion.

The pressure sensor with the above-described structure provides high corrosion resistance and high accuracy in pressure detection although it is easily produced only by press-fitting the resin sheet 241 to the sensor chip 220. The pressure sensor is effective when it is used for detecting pressure of exhaust gases from an engine because the wiring patterns are formed in the FPC 240 and it has high corrosion to acid fluid. In an exhaust system of a gasoline-powered vehicle, the pressure sensor is exposed to the exhaust gases, which includes acid fluid, and the pressure of the exhaust gases is applied to the sensor chip 220. Bonding pads and bonding wires have low corrosion resistance when they are made of aluminum as in the related arts.

However, the pads 226a–226f and the wiring patterns 242a–242f are sealed with the resin sheet 241 and not exposed to the corrosive atmosphere while maintaining the pressure detection sensitivity by providing the thorough-hole 243 to bare the diaphragm 223. Therefore, the pressure sensor can accurately detect pressures in the corrosive atmosphere. The pads 226a–226f and the wiring patterns 242a–242f are protected from corrosion with the FPC 240 while the pressure detection sensitivity and reliability of the wiring patterns 242a–242f are maintained even when the sensor chip 220 is used in a corrosive atmosphere.

The present invention should not be limited to the embodiment previously discussed and shown in the figures, but may be implemented in various ways without departing from the spirit of the invention. For example, the pressure sensor can be used for detecting tire inflation pressure. The case 200 may only house the sensor chip 220.

What is claimed is:

1. A pressure sensor comprising:
a pressure sensor chip having a diaphragm and pads; and
a flexible printed circuit board having wiring patterns and a resin sheet having flexibility and insulation, the resin sheet having a through-hole and sealing the wiring patterns therein, wherein
the wiring patterns are connected to the pads, and
the resin sheet is press-fitted to the pressure sensor chip such that the diaphragm is bared at the through-hole and junctions between the wiring patterns and the pads are sealed.

2. The pressure sensor according to claim 1, wherein:
the resin sheet is a thermoplastic resin sheet; and
the resin sheet is press-fitted to the pressure sensor chip by thermocompression.

3. The pressure sensor according to claim 1, wherein the pressure sensor chip receives pressure of an exhaust gas from an engine.

4. A pressure sensor comprising:
a pressure sensor chip having a diaphragm and pads;
a circuit chip having a surface on which the pressure sensor chip is mounted and pads formed on the surface in an area other than in which the pressure sensor is located; and
a flexible printed circuit board having wiring patterns and a resin sheet having flexibility and insulation, the resin sheet having a through-hole and sealing the wiring patterns therein, wherein
the pressure sensor chip is mounted on the circuit chip,
the wiring patterns are connected to the pads of the pressure sensor chip,
the pads of the circuit chip are connected to the wiring patterns, and
the resin sheet is press-fitted to the pressure sensor chip and the circuit chip such that the diaphragm is bared at the through-hole, and junctions between the wiring patterns and the pads of the pressure sensor chip and junctions between the pads of the circuit chip and the wiring patterns are sealed.

5. The pressure sensor according to claim 4, wherein:
the resin sheet is a thermoplastic resin sheet; and
the resin sheet is press-fitted to the pressure sensor chip by thermocompression.

6. The pressure sensor according to claim 4, wherein the pressure sensor chip receives pressure of an exhaust gas from an engine.

7. A pressure sensor comprising:
a pressure sensor chip having a diaphragm and pads;
a case having a chip housing portion for housing the pressure sensor chip such that a surface of the pressure sensor chip on which the pads are formed is bared at an opening thereof; and
a flexible printed circuit board having wiring patterns sealed with a resin sheet having flexibility and insulation, the resin sheet sealing the wiring patterns therein, wherein
the wiring patterns are connected to the pads of the pressure sensor chip, and
the resin sheet is press-fitted to the case and a surface of the pressure sensor chip on which the pads are formed, to cover the opening, and to seal junctions between the wiring patterns and the pads.

8. The pressure sensor according to claim 7, wherein the flexible printed circuit board has a through-hole at which the diaphragm is bared.

9. The pressure sensor according to claim 7, wherein:
the resin sheet is a thermoplastic resin sheet; and
the resin sheet is press-fitted to the pressure sensor chip by thermocompression.

10. The pressure sensor according to claim 7, further comprising a circuit chip having pads and fixed in the chip housing portion such that a surface thereof on which the pads are formed is bared at the opening, wherein:
the pads of the circuit chip are connected to the wiring patterns;
the resin sheet is press-fitted to the case, the surface of the pressure sensor chip, and the surface of the circuit chip to cover the opening, and to seal the junctions between the wiring patterns and the pads of the pressure sensor chip and junctions between the wiring patterns and the pads of the circuit chip.

11. The pressure sensor according to claim 7, wherein the pressure sensor chip receives pressure of an exhaust gas from an engine.

12. The pressure sensor according to claim 10, wherein:
the case further includes a plate portion formed in a quadrangle plate and a frame portion formed in a quadrangle frame;
the frame portion has first, second, third, and fourth sides;
the first, the second, and the third sides have thickness smaller than that of the fourth side;
the pressure sensor chip and the circuit chip are arranged in the chip housing portion such that top surfaces of the pressure sensor chip and the circuit chip are positioned between upper surfaces of the first, the second, and the third sides, which are substantially leveled, and an upper surface of the fourth side; and
the resin sheet is press-fitted to the upper surfaces of the first, the second, and the third sides, and an inner wall of the fourth side.

* * * * *